United States Patent [19]

Hasegawa et al.

[11] Patent Number: 5,174,400

[45] Date of Patent: Dec. 29, 1992

[54] WEIGHING APPARATUS WHICH AUTOMATICALLY SWITCHES BETWEEN MULTIPLE WEIGHING UNITS BASED ON AN INSTABILITY IN A WEIGHING SIGNAL

[75] Inventors: Katsunori Hasegawa, Kyoto; Shinsuke Sakamoto, Shiga, both of Japan

[73] Assignee: Ishida Scales Mfg. Co., Ltd., Kyoto, Japan

[21] Appl. No.: 733,780

[22] Filed: Jul. 22, 1991

[30] Foreign Application Priority Data

Jul. 24, 1990 [JP] Japan .................................. 2-196559

[51] Int. Cl.⁵ .............................................. G01G 19/00
[52] U.S. Cl. .................................. 177/200; 177/25.13; 177/50; 177/165
[58] Field of Search ................. 177/50, 199, 200, 245, 177/264, 25.11, 25.13, 25.18, 25.17, 165

[56] References Cited

U.S. PATENT DOCUMENTS

| | | |
|---|---|---|
| 3,826,319 | 7/1974 | Loshbough .................... 177/25.15 |
| 3,939,332 | 2/1976 | Williams, Jr. et al. ............ 364/567 |
| 4,157,738 | 6/1979 | Nishiguchi et al. .................. 177/1 |
| 4,375,243 | 3/1983 | Doll ................................. 177/25.11 |
| 4,473,126 | 9/1984 | Hirano ................................. 177/1 |
| 4,527,646 | 7/1985 | Hirano .......................... 177/25.11 |
| 4,705,126 | 11/1987 | Naito ................................ 177/50 |
| 4,706,767 | 11/1987 | Chou ................................ 177/50 |
| 4,804,052 | 2/1989 | Griffen ......................... 177/25.14 |

Primary Examiner—Benjamin R. Fuller
Assistant Examiner—Randy W. Gibson
Attorney, Agent, or Firm—Sughrue Mion Zinn Macpeak & Seas

[57] ABSTRACT

In the weighing apparatus, a plurality of weighing sections are connected to a main unit having a display section, and weight data from one of the weighing sections are indicated by the display section. Each weighing section has an instability detection section for detecting the instability of a weight signal. The main unit has a section by which the weight data from the weighing section whose weight signal is instable are selected on the basis of a signal from the instability detection section.

10 Claims, 3 Drawing Sheets

TIMING OF INPUTTING SIGNAL FROM FIRST WEIGHTING MEANS

TIMING OF INPUTTING SIGNAL FROM SECOND WEIGHTING MEANS

WEIGHING APPARATUS WHICH AUTOMATICALLY SWITCHES BETWEEN MULTIPLE WEIGHING UNITS BASED ON AN INSTABILITY IN A WEIGHING SIGNAL

BACKGROUND OF THE INVENTION

The present invention relates to a weighing apparatus in which a plurality of weighing means different from each other in weighing sensitivity are connected to a display/operation unit so that one of the weighing means is automatically selected.

In one method of determining the number of articles manufactured in compliance with the same standard, the quotient of the total weight of the articles and the weight of the single article is calculated. The method needs a weighing apparatus which meets the mutually conflicting requirements that the single article is weighed as accurately as possible and the articles are weighed in as large a number as possible.

In order to meet the requirements, a first weighing means high in weighing sensitivity and a second weighing means high in weighing capacity are connected to a main unit in the apparatus so that one of the weighing means is selected with the changeover switch of the main unit depending on a purpose of weighing.

In the above-mentioned weighing apparatus, the first or second weighing means can be selected depending on the purpose of weighing, by manipulating the changeover switch, to obtain accurate data on the number of the articles. However, since it is necessary to manipulate the changeover switch every time the weighed object is changed for another one, a problem arises that it is troublesome to operate the apparatus.

SUMMARY OF THE INVENTION

The present invention was made in order to solve the problem. Accordingly, it is an object of the invention to provide a novel weighing apparatus in which a plurality of weighing means can be automatically switched between depending on an object which is weighed by the apparatus.

In the weighing apparatus provided in accordance with the present invention, the plurality of weighing means are connected to a main unit having a display means, and weight data from one of the weighing means are indicated by the display means. Each of the weighing means has an instability detection means for detecting the instability of a weight signal. The main unit has a means by which the weight data from the weighing means whose weight signal is instable are selected on the basis of a signal from the instability detection means.

In the weighing apparatus provided in accordance with the present invention, the weighing means carrying the weighed article is selected on the basis of the signal from the instability detection means so that the weight data from the weighing means are entered into the main unit. Thus, the article to be weighed can be automatically weighted by the optimal weighing means without manipulating a changeover switch.

DETAILED DESCRIPTION OF THE PREFERRED EMBODIMENTS

Preferred embodiments of the present invention will now be described with reference to the drawings attached hereto.

Figure 1:
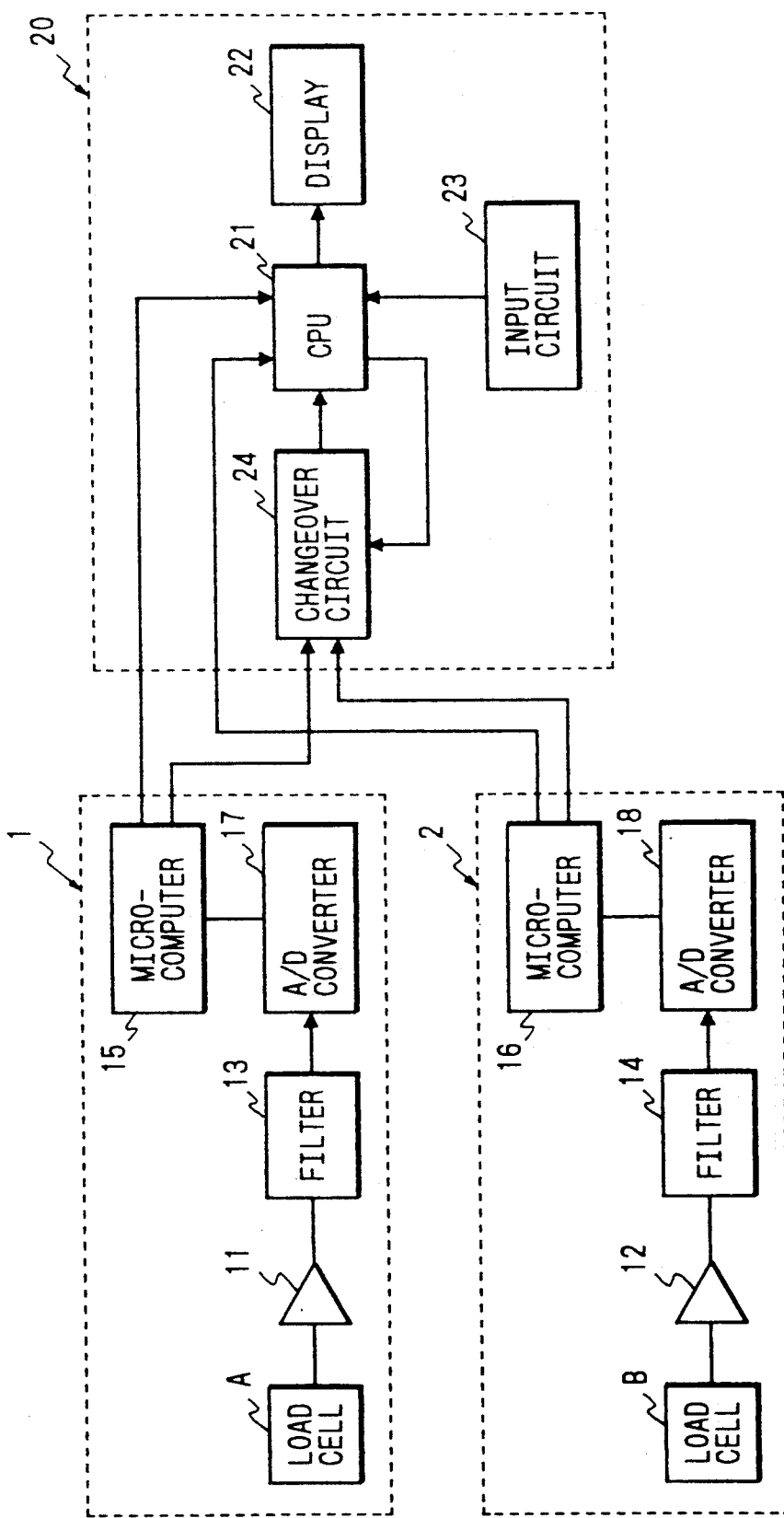
FIG. 1 is a schematic view of a weighing apparatus which is a first embodiment of the present invention.

FIG. 1 shows a weighing apparatus which is a first embodiment. The apparatus comprises a first weighing means 1, a second weighing means 2, and a main unit 20. The first and the second weighing means 1 and 2 differ from each other in weighing sensitivity and weighing capacity. The first weighing means 1 has a well known load cell A as a weight detecting means, which includes a support member, a strain generator secured as a cantilever to the support member, a load carrier fastened to the strain generator at the free end thereof, and strain gauges secured to the strain generator. The first weighing means further has a preamplifier 11, a filter 13, a microcomputer 15, and an A/D converter 17. Also, the second weighing means 2 has a well known load cell B, a preamplifier 12, a filter 14, a microcomputer 16, and an A/D converter 18.

Figure 3:
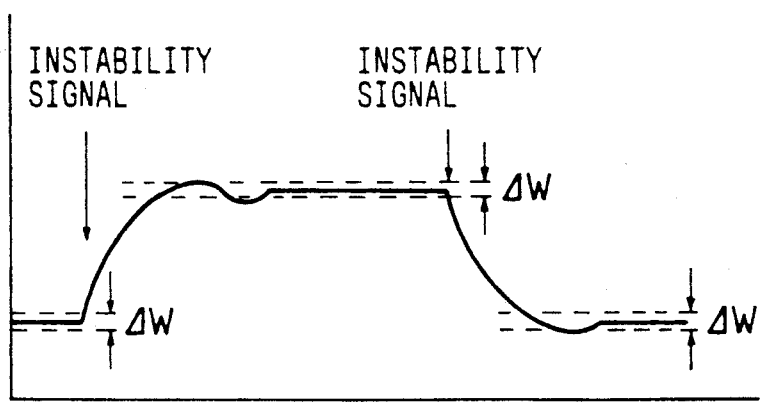
FIG. 3 is a graph to show the wave form of a weight signal in the apparatus shown in FIG. 1.

In the first weighing means 1, a weight signal is sent out from a Wheatstone bridge constructed of the strain gauges of the load cell through the preamplifier 11 and the filter 13 to the A/D converter 17 which is controlled by the microcomputer 15. The microcomputer 15 also serves as a means for judging on the basis of the weight signal from the Wheatstone bridge whether there is an article on the load carrier of the load cell. The A/D converter 17 converts the weight signal into a digital signal. The microcomputer 15 detects the change in the weight signal so as to send out an instability signal as well as weight data. The instability signal is sent out when the weight signal has shifted from a stable state to an instable state as shown in FIG. 3.

The second weighing means 2 is substantially the same in constitution and operation as the first weighing means 1.

The main unit 20 has a microcomputer 21, a display unit 22, an input circuit 23, and a changeover circuit 24. The microcomputer 21 receives the weight data from either of the first and the second weighing means 1 and 2 through the changeover circuit 24. The microcomputer 21 operates the changeover circuit 24 depending on the combination of the instability signals from the microcomputers 15 and 16 of the first and the second weighing means 1 and 2, to select the first or second weighing means as shown in Tables 1 and 2.

TABLE 1

In the case that the first weighing means is already selected:

| | | State of first weighing means | |
|---|---|---|---|
| | | Stable | Instable |
| State of second weighing means | Stable | First weighing means | First weighing means |
| | Instable | Second weighing means | First weighing means |

TABLE 2

In the case that the second weighing means is already selected:

|  |  | State of first weighing means | |
| --- | --- | --- | --- |
|  |  | Stable | Instable |
| State of second weighing means | Stable | Second weighing means | First weighing means |
|  | Instable | Second weighing means | Second weighing means |

If the instability signal is sent from the second weighing means 2 to the common section 20 in the case that the first weighing means 1 is already selected by the main unit, the changeover circuit 24 is switched over from the first weighing means to the second weighing means so that the weight data are sent from the second weighing means to the microcomputer 21 through the changeover circuit. However, if the instability signals are sent from both the weighing means 1 and 2 to the main unit 20, the changeover circuit 24 is kept switched over to the first weighing means, because the first weighing means has priority over the second weighing means. If the instability signal is sent from the first weighing means 1 to the main unit 20 in the case that the second weighing means 2 is already selected by the main unit, the changeover circuit 24 is switched over from the second weighing means to the first weighing means so that the weight data are sent from the first weighing means to the microcomputer 21 through the changeover circuit.

In this embodiment, when electric power is applied to the weighing apparatus, there is no article on the load cells A and B of the first and the second weighing means 1 and 2. Thus, the microcomputer 21 of the main unit 20 sends out a signal to the changeover circuit 24 to select predetermined one of both the weighing means, for example, to select the first weighing means to set the apparatus in the state that the main unit can receive the weight data from the first weighing means.

In this state, when articles to be weighed by the apparatus are put on the load cell A of the first weighing means 1, the Wheatstone bridge of the load cell A sends out a transient signal due to the load of the articles and the microcomputer 15 sends out an instability signal due to the transient signal. As a result, the main unit 20 receives the instability signal from the first weighing means 1, and the microcomputer 21 therefore still keeps selecting the first weighing means 1. The A/D converter 17 converts a weight signal from the Wheatstone bridge into a digital signal which is sent out to the main unit 20 by means of the microcomputer 15.

The microcomputer 21 of the main unit 20 determines the weight of the single article by dividing the weight data from the first weighing means by the number of all the articles, which is applied to the microcomputer through the input circuit 23. The microcomputer memorizes the determined weight as sample unit weight, and causes the display unit 22 to indicate the determined weight.

In this state, when other articles are newly put on the load cell A in addition to the former articles, the microcomputer 15 sends out an instability signal and weight data. The microcomputer 21 then determines the number of all the articles on the load cell A by dividing the weight data by the stored sample unit weight, determines new sample unit weight by dividing the weight data by the determined number, memorizes the new sample unit weight instead of the former sample unit weight, and causes the display unit 22 to indicate the new sample unit weight. In this way, at every time when an article is newly put on the load cell A, a new sample unit weight is determined, which is memorized instead of the former unit weight and displayed.

When an unknown number of articles to be weighed by the apparatus are then put on the load cell B of the second weighing means 2, the microcomputer 16 thereof sends out an instability signal and the main unit 20 therefore switches over the changeover circuit 24 from the first weighing means 1 to the second weighing means so that the main unit 20 receives weight data from the second weighing means instead of those from the first weighing means. The microcomputer 21 of the main unit 20 determines the number of the articles on the load cell B by dividing the weight data from the second weighing means 2 by the newest sample unit weight, and causes the display unit 22 to indicate the determined number. The changeover circuit 24 is kept switched over to the second weighing means 2 until an instability signal is sent out from the first weighing means 1 to the main unit 20. When another unknown number of articles are then put on the load cell B in addition to the former articles thereon, the microcomputer 21 of the main unit 20 determines the number of the newly put articles on the load cell B by dividing weight data from the second weighing means 2 by the newest sample unit weight, adds the determined number to that of the previously put articles on the load cell to calculate the number of all the articles thereon, and causes the display unit 22 to indicate the calculated number. Every time such an unknown number of articles are thus additionally put on the load cell B, the number of the articles is determined and added to that of previously put articles on the carrier and the number of all the articles thereon is calculated and indicated. In this state, even if the articles are removed from the load cell B, the display unit 22 indicates the number (zero at the present state) of articles for the second weighing means 2 because the changeover circuit 24 still remains switched over to the second weighing means.

When the articles on the load cell A of the first weighing means 1 are removed therefrom and an article different in weight from each of the former is then put on the load cell so as to be weighed, an instability signal is sent out from the first weighing means to the main unit 20 and the microcomputer 21 thereof switches the changeover circuit 24 over from the second weighing means 2 to the first weighing means so that the microcomputer receives weight data from the first weighing means through the changeover circuit. The changeover circuit 24 is kept switched over to the first weighing means 1 until an instability signal is sent out from the second weighing means 2 to the main unit 20.

Figure 2:
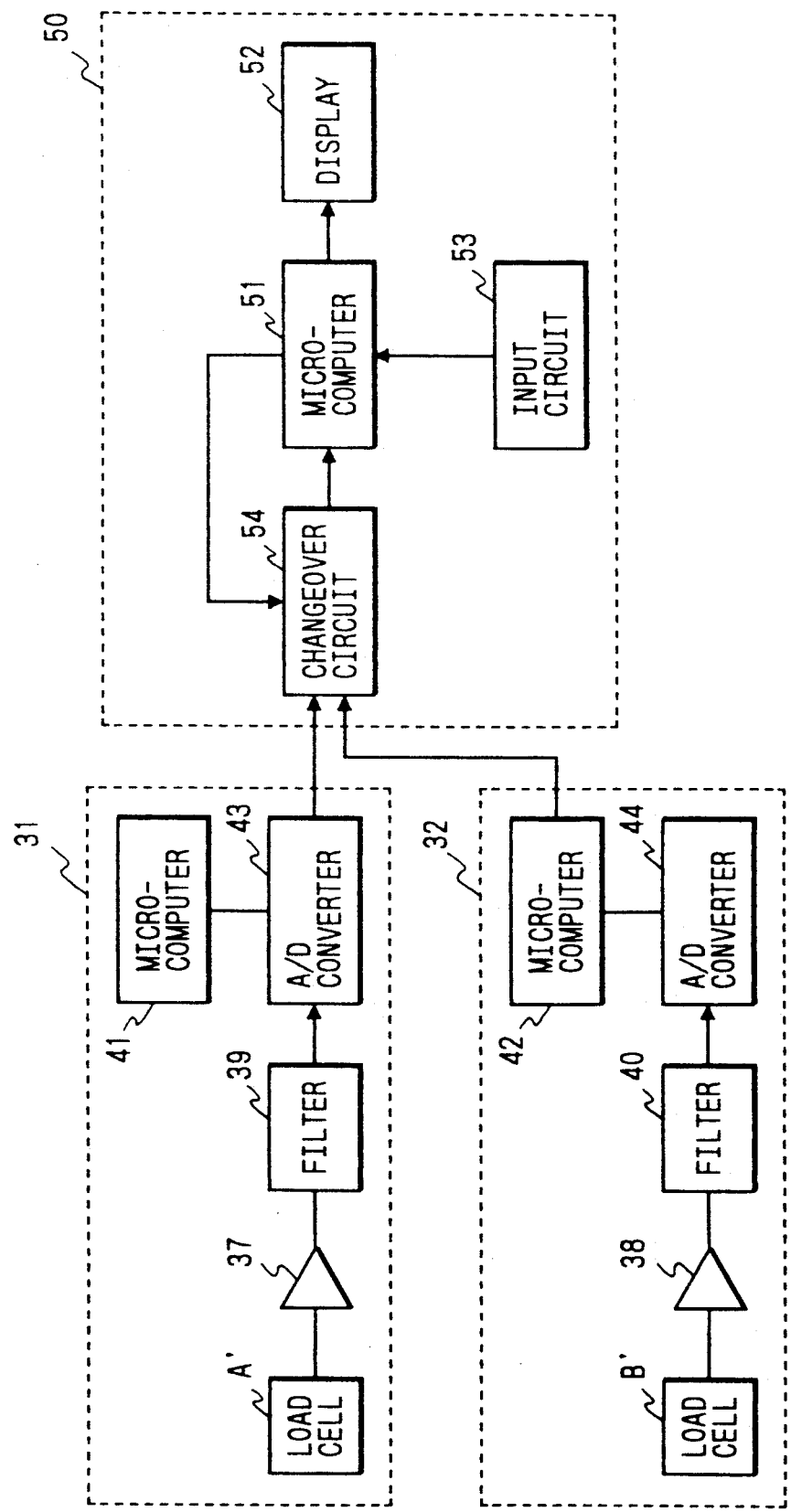
FIG. 2 is a schematic view of a weighing apparatus which is a second embodiment of the present invention.

FIG. 2 shows a weighing apparatus which is a second embodiment. The apparatus comprises a first weighing means 31, a second weighing means 32, and a main unit 50. The first and the second weighing means 31 and 32 differ from each other in weighing sensitivity and weighing capacity. The first weighing means 31 has a well known load cell A' as a weight detecting means, a preamplifier 37, a filter 39, a microcomputer 41, and an A/D converter 43. Also, the second weighing means 32 has a well known load cell B', a preamplifier 38, a filter 40, a microcomputer 42, and an A/D converter 44.

In the first weighing means 31, a weight signal is sent out from a Wheatstone bridge constructed of strain gauges of the load cell A' through the preamplifier 37 and the filter 39 to the A/D converter 43. The weight signal is converted to a digital signal by the A/D converter 43, which is controlled by the microcomputer 41, and is sent to the main unit 50.

The second weighing means 32 is substantially the same in constitution and operation as the first weighing means 31.

The main unit 50 has a microcomputer 51, a display unit 52, an input circuit 53 and a changeover circuit 54.

Figure 4:
FIG. 4 is a time chart of the apparatus shown in FIG. 2.
Figure 4:

The microcomputer 51 of the main unit 50 receives weight data from the first and the second weighing means 31 and 32 alternately through the changeover circuit 54 as shown in FIG. 4, and sequentially memorizes the selected side data in prescribed storage areas.

In this embodiment, when electric power is applied to the weighing apparatus, the microcomputer 51 of the main unit 50 operates the changeover circuit 54 so as to receive the weight data from the first and the second weighing means 31 and 32 alternately through the changeover circuit and memorize the data in the prescribed storage areas. In this state, when a known number of articles to be weighed by the apparatus are put on the load cell A' of the first weighing means 31, the means 31 sends out a transient signal due to the putting of the articles on the load cell. The microcomputer 51 judged on the basis of the transient signal that the articles are put on the load cell. As a result, weight data from the first weighing means 31 are sent out from the microcomputer 51 to the display unit 52 so that the data are indicated by the display unit until the second weighing means 32 enters into an instable state due to the putting of articles on the load cell B'. On the other hand, once weight data from the second weighing means 32 are indicated by the display unit 52, the indication is continued as long as the first weighing means 31 does not enter into an instable state. In this embodiment as well as in the preceding one, the sample unit weight of the articles is first determined through the use of the first weighing means 31 and then, by using the sample unit weight, the number of articles can be determined for a unknown number of articles on the load cell of the second weighing means 32.

Although the number of article is calculated on the basis of the sample unit weight in each of the embodiments, the present invention may be otherwise embodied as such a weighing apparatus that a plurality of weighing means are provided at mutually different places in a selling area or the like and weight data from the weighing means are indicated by the common display unit.

As described above, in a weighing apparatus provided in accordance with the present invention, a plurality of weighing means are connected to a main unit having a display means for indicating weight data from one of the weighing means. Since each of the weighing means has an instability detection means for detecting the instability of a weight signal and the main unit has a means by which the weight data from the weighing means whose weight signal is instable are selected on the basis of a signal from the instability detection means, the plurality of weighing means can be automatically changed over for each other depending on a weighed object. Accordingly, the manipulating property of the apparatus is superior to that of a weighing apparatus whose weighing means are manually changed over by means of a switch.

What is claimed is:

1. A weighing apparatus comprising:
   a plurality of units for weighing articles and for producing weight signals and weight data, representative of said weighed articles, each of said plurality of weighing units comprising instability detection means for detecting a change in a corresponding weight signal and producing an instability signal in response thereto; and
   a main unit, connected to said plurality of weighing units, said main unit including:
   means for automatically selecting weight data from one of said plurality of weighing units based on instability signals from said instability detection means.

2. A weighing apparatus as claimed in claim 1 wherein each of said plurality of weighing units further comprises: a load cell for detecting a weight of said articles and for outputting said representative weight signal, a preamplifier for amplifying the weight signal, a filter for filtering the weight signal, and an A/D converter for converting the weight signal into digital weight data, and wherein said instability detection means includes a microcomputer that outputs the instability signal when the weight signal has shifted from a stable state to an unstable state.

3. A weighing apparatus as claimed in claim 2, wherein said selecting means includes a microcomputer and a changeover circuit, said microcomputer controlling said changeover circuit to select one of said plurality of weighing units based on a combination of the instability signals from all of said plurality of weighing units.

4. A weighing apparatus, comprising:
   a plurality of weighing units for weighing articles and producing weight data representative thereof, each of said weighing units having means for outputting a transient signal when articles are added to the weighing unit, and
   a main unit connected to said plurality of weighing units, said main unit comprising:
   a detecting unit for alternately detecting weight data from each of said plurality of weighing units, wherein said weight data from a particular one of said weighing units is based on said transient signal output from each of the weighing units.

5. A weighing apparatus as claimed in claim 4, wherein each of said plurality of weighing units further comprises a load cell for detecting a weight of said articles and for outputting said weight signal representative thereof, a preamplifier for amplifying the weight signal, a filter for filtering the weight signal, an A/D converter for converting the weight signal into digital weight data, and a microcomputer for controlling said A/D converter, wherein each of said weighing means outputs a transient signal each time an article to be weighted is added to said load cell.

6. A weighing apparatus as claimed in claim 5, wherein said detecting means includes a microcomputer, said microcomputer sending out the weight data from one of said plurality of weighing means to said display means when said microcomputer detects the transient signal from said one of said plurality of weighing means.

7. The weighing apparatus of claim 1, wherein said main unit includes means for displaying said selected weight data.

8. The weighing apparatus of claim 4, wherein said main unit includes a display unit for indicating weight data from one of said plurality of weighing units.

9. The weighing apparatus of claim 1, wherein said plurality of weighing means includes first and second units, said selection means only switching from the first to the second unit when the first unit is in a stable condition and the second unit is in an unstable condition.

10. The weighing apparatus of claim 4, wherein said plurality of weighing units includes first and second units, said main unit only switching from a state of outputting weight signals from the first unit to a state of outputting weight signals from the second unit when the first unit is in a stable condition and the second unit is in an unstable condition.

* * * * *